United States Patent
Sullivan

(10) Patent No.: US 10,333,164 B2
(45) Date of Patent: Jun. 25, 2019

(54) ELECTROCHEMICAL-BASED PURIFICATION OF ELECTROLYTE SOLUTIONS, AND RELATED SYSTEMS AND METHODS

(71) Applicant: Vionx Energy Corporation, Woburn, MA (US)

(72) Inventor: Joseph T. Sullivan, Hanover, NH (US)

(73) Assignee: Vionx Energy Corporation, Woburn, MA (US)

( * ) Notice: Subject to any disclaimer, the term of this patent is extended or adjusted under 35 U.S.C. 154(b) by 0 days.

(21) Appl. No.: 15/726,858

(22) Filed: Oct. 6, 2017

(65) Prior Publication Data

US 2018/0102561 A1    Apr. 12, 2018

Related U.S. Application Data

(60) Provisional application No. 62/405,576, filed on Oct. 7, 2016.

(51) Int. Cl.
*H01M 8/06* (2016.01)
*C01G 31/02* (2006.01)
(Continued)

(52) U.S. Cl.
CPC .......... *H01M 8/0693* (2013.01); *C01G 31/00* (2013.01); *C01G 31/02* (2013.01); *H01M 8/188* (2013.01); *C01B 3/00* (2013.01)

(58) Field of Classification Search
CPC ...... H01M 8/0693; H01M 8/06; H01M 8/188; H01M 8/18; C01B 3/00; C01B 31/02; C01G 31/00; C01G 31/02
See application file for complete search history.

(56) References Cited

U.S. PATENT DOCUMENTS 3,279,949 A   10/1966   Schaefer et al.
5,587,132 A   12/1996   Nakajima et al.
(Continued)

FOREIGN PATENT DOCUMENTS

EP   2642572 A2   9/2013
EP   3176862 A1   6/2017
(Continued)

OTHER PUBLICATIONS

Merriam-Webster (Precipitate, Definition 3, {https://www.merriam-webster.com/dictionary/precipitate} Wayback Machine posting evidence Jan. 7, 2007).*

(Continued)

*Primary Examiner* — Jonathan G Leong
*Assistant Examiner* — Aaron J Greso
(74) *Attorney, Agent, or Firm* — Downs Rachlin Martin PLLC

(57) ABSTRACT

Methods and systems for removing impurities from electrolyte solutions having three or more valence states. In some embodiments, a method includes electrochemically reducing an electrolyte solution to lower its valence state to a level that causes impurities to precipitate out of the electrolyte solution and then filtering the precipitate(s) out of the electrolyte solution. In embodiments in which the electrolyte solution is desired to be at a valence state higher than the precipitation valence state, a method of the disclosure includes oxidizing the purified electrolyte solution to the target valence.

20 Claims, 8 Drawing Sheets

(51) Int. Cl.
*H01M 8/18* (2006.01)
*C01G 31/00* (2006.01)
*C01B 3/00* (2006.01)

(56) References Cited

U.S. PATENT DOCUMENTS

| | | | |
|---|---|---|---|
| 5,849,429 A | 12/1998 | Sazhin et al. | |
| 6,562,514 B1 | 5/2003 | Kazacos et al. | |
| 6,764,663 B2 | 7/2004 | Monaghan et al. | |
| 7,258,947 B2 | 8/2007 | Kubata et al. | |
| 9,331,356 B2 | 5/2016 | Dong et al. | |
| 9,391,340 B2 | 7/2016 | Dong et al. | |
| 9,647,290 B2 | 5/2017 | Sekine et al. | |
| 2004/0191623 A1* | 9/2004 | Kubata | H01M 8/188 429/189 |
| 2009/0286154 A1 | 11/2009 | Dormehl et al. | |
| 2010/0143781 A1 | 6/2010 | Keshavarz et al. | |
| 2013/0095362 A1 | 4/2013 | Keshavarz et al. | |
| 2015/0221969 A1 | 8/2015 | Sekine et al. | |
| 2016/0093925 A1 | 3/2016 | Li et al. | |
| 2016/0111744 A1* | 4/2016 | Harrer | H01M 8/18 429/409 |
| 2017/0229728 A1* | 8/2017 | Dong | H01M 8/188 |

FOREIGN PATENT DOCUMENTS

| | | | | |
|---|---|---|---|---|
| WO | 1989005363 A1 | | 6/1989 | |
| WO | WO 95/12219 | * | 5/1995 | H01M 8/08 |
| WO | 2013027076 A1 | | 2/2013 | |
| WO | WO 2014/198546 | * | 12/2014 | H01M 8/18 |
| WO | WO 2016/017393 | * | 2/2016 | H01M 8/02 |

OTHER PUBLICATIONS

International Search Report and Written Opinion dated May 23, 2018, in connection with PCT/US2017/055473, filed Oct. 6, 2017.

* cited by examiner

ELECTROCHEMICAL-BASED PURIFICATION OF ELECTROLYTE SOLUTIONS, AND RELATED SYSTEMS AND METHODS

RELATED APPLICATION DATA

This application claims the benefit of priority of U.S. Provisional Patent Application Ser. No. 62/405,576, filed on Oct. 7, 2016, and titled "REDUCTION-BASED PURIFICATION OF ELECTROLYTE SOLUTIONS AND RELATED SYSTEMS AND METHODS", which is incorporated herein by reference in its entirety.

FIELD OF THE INVENTION

The present invention is related to purification and production of electrolyte solutions. More particularly, the present invention is directed to electrochemical-based purification of electrolyte solutions, and related systems and methods.

BACKGROUND

Electrolytes for batteries and other uses generally need to be free of impurities that are detrimental to those uses. For example, in the context of a redox flow battery, each electrolyte used needs to be free of impurities that foul components of the battery. In a particular example, a vanadium redox flow battery (VRFB) is a system that converts electrical energy into chemical energy and then releases that chemical energy as electricity when there is demand. This type of battery is often paired with a solar and/or wind farm to help smooth out the power production intermittency associated with these renewable energy sources.

A VRFB comprises an electrochemical cell that performs the conversion between chemical and electrical energy. The electrochemical cell includes a negative electrode, an electrolyte separator (often a proton exchange membrane), and a negative electrode. Two separate vanadium solutions are stored in individual tanks—one tank contains a negative electrolyte solution that is fed to the negative electrode, and the other tank contains a positive electrolyte solution that is fed to the positive electrode. During normal operation, the negative electrolyte solution contains vanadium (II) and (III) ions, and the positive electrolyte solution contains vanadium (IV) and (V) ions. During charge, vanadium (III) ions are reduced to vanadium (II) ions in the negative electrolyte solution at the negative electrode, and vanadium (IV) ions are oxidized to vanadium (V) ions in the positive electrolyte solution at the positive electrode; the opposite happens during discharge.

When commissioning a new VRFB, a balanced electrolyte solution of average valence of roughly 3.5, i.e., an electrolyte solution of equal concentration of vanadium (III) and vanadium (IV) ions, is transferred into both the negative and positive electrolyte tanks. The battery is slowly charged until the negative and positive electrolyte solutions are at the desired ratio of vanadium (II)/(III) and vanadium (IV)/(V) ions, respectively. After this initial charge, some impurities present in the negative electrolyte solution will typically precipitate out as a solid metal phase precipitate. These impurities include, but are not limited to, As and Ge. These precipitates are detrimental to the electrochemical cell, because they clog the negative electrode and negatively impact battery performance.

The majority of conventional methods for making a vanadium-based electrolyte solution involve one of two methods:

Method 1: Mixing $V_2O_3$ and $V_2O_5$ in a 3:1 molar ratio in excess acid to produce a solution of a 3.5 average valence.

Method 2: Using a VRFB electrochemical cell in which the negative electrode is used to reduce a vanadium-based electrolyte solution to a 3.5 valence and the positive electrode is oxidizing a vanadium-based electrolyte solution that is periodically or continually reduced using a chemical reducing agent. This type of approach is needed because most organic reducing agents are only able to reduce vanadium (V) ions to vanadium (IV) ions (i.e. most organic reductants can't chemically reduce vanadium (IV) ions to a lower valence).

Neither of these conventional methods adequately remove impurities that often foul the electrochemical cell of a VRFB. Rather, both methods require that the vanadium feedstocks have low impurity content of select impurities for proper function and inhibiting fouling in a VRFB system. Consequently, many purification methods focus on the purification of the vanadium feedstock. While many of these methods are effective, they consume many chemicals and the final product commands a high cost premium.

SUMMARY OF THE DISCLOSURE

In one implementation, the present disclosure is directed to a method of making a purified electrolyte solution. The method includes providing an electrolyte solution having a precipitation valence and containing at least one impurity that precipitates out of the electrolyte solution when the valence of the electrolyte solution is at or below the precipitation valence; reducing the electrolyte solution to a valence below the precipitation valence so as to cause the at least one impurity to precipitate out of the electrolyte solution as a precipitate; and mechanically separating the precipitate out of the electrolyte solution so as to make the purified electrolyte solution.

In another implementation, the present disclosure is directed to a method of commissioning a redox flow battery having a positive side and a negative side. The method includes providing an electrolyte solution having an initial valence and at least four available oxidation states comprising a set of higher oxidation states and a set of lower oxidation states; reducing the electrolyte solution to a valence below the initial valence to make a reduced electrolyte solution having a valence within the set of lower oxidation states; oxidizing a first portion of the reduced electrolyte solution to make a positive-side electrolyte solution having a valence within the set of higher oxidation states; providing, for the commissioning, the positive-side electrolyte solution for the positive side of the redox flow battery; and providing, for the negative side of the redox flow battery for the commissioning, a second portion of the reduced electrolyte solution as a negative-side electrolyte solution having a valence within the set of lower oxidation states.

In yet another implementation, the present disclosure is directed to a system for making a purified electrolyte solution from an electrolyte solution containing at least one impurity that precipitates out of the electrolyte solution at or below a precipitation valence. The system includes a reduction system that includes an electrochemical reduction cell designed and configured to electrochemically reduce the electrolyte solution based on a reductant; a recirculation loop designed and configured to recirculate at least a portion of the electrolyte solution to the electrochemical reduction cell; a reduction-process control system in operative communication with the reduction system so as to control the valence of the electrolyte solution in the reduction system to a desired value at or below the precipitation value so as to cause the at least one impurity to precipitate out of the electrolyte solution as a precipitate; and a solid/liquid mechanical separation system designed and configured to remove at least a portion of the precipitate out of the electrolyte solution to make the purified electrolyte solution.

In still yet another implementation, the present disclosure is directed to a system for making a valence-adjusted electrolyte solution from an electrolyte solution having at least four oxidation states. The system includes a reduction system that includes an electrochemical reduction cell designed and configured to electrochemically reduce the electrolyte solution based on a reductant; a recirculation loop designed and configured to recirculate at least a portion of the electrolyte solution to the electrochemical reduction cell; a reduction-process control system in operative communication with the reduction system so as to control the valence of the electrolyte solution in the reduction system to a desired value; and an output designed, configured, and located to output the electrolyte solution as previously reduced electrolyte solution at about the desired value; and an oxidation system that includes an electrochemical oxidation cell designed and configured to electrochemically oxidize the previously reduced electrolyte solution based on an oxidant; a recirculation loop designed and configured to recirculate at least a portion of the previously reduced electrolyte solution to the electrochemical oxidation cell; an oxidation-process control system in operative communication with the oxidation system so as to control the valence of the previously reduced electrolyte solution in the oxidation system to a desired final value; and an output designed, configured, and located to output the previously reduced electrolyte solution at about the desired final value.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

In some aspects, the present disclosure is directed to methods and systems for removing impurities from an electrolyte solution using a chemical reduction and filtration process. A particularly useful embodiment is described below in the context of a vanadium redox flow battery (VRFB) in which one or more impurities in the vanadium-based electrolyte solution that would in the normal course clog the electrochemical cell of the VRFB during normal use are removed. An oxidation process, such as an electrochemical oxidation process, can be used after filtration to adjust the valence of the reduced electrolyte solution to a desired value, often an electrolyte 3.5 valence.

In other aspects, the present disclosure is directed to methods and systems directed to and relating to commissioning a redox flow battery (RFB). In a particular embodiment, an electrolyte solution is first reduced to a relatively low oxidation valence and then oxidized to make negative and positive electrolyte solutions having differing valences. The negative and positive electrolyte solutions are installed into the negative and positive sides of an RFB, respectively, thereby eliminating the need for the typical battery-charging process that accompanies conventional battery commissioning. These and other aspects of the present disclosure are described and exemplified below in detail.

Figure 1:
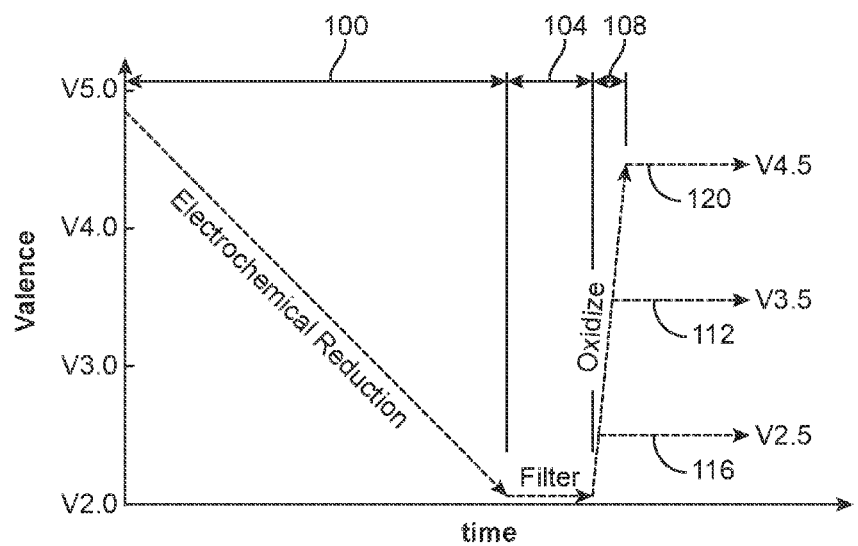
FIG. 1 is a graph of valence versus time for an example electrolyte formation/purification and valence adjustment process in which the example electrolyte solution has four oxidation states ranging from +2 to +5.

Referring now to the drawings, FIG. 1 illustrates an overall process of making an electrolyte solution having a desired valence by reduction-based purification followed by filtration and oxidation-based valence adjustment. To understand the purification process, i.e., the electrochemical reduction and filtering shown in FIG. 1, it must be understood that the purification at issue involves the removal of solid precipitates that form from impurities in the electrolyte solution at a relatively low vanadium valence. In some electrolyte solutions, certain impurities are in aqueous states when the valence of the electrolyte solution is relatively high but are transformed to their solid forms when the valence of the electrolyte solution is sufficiently low. Depending on the use of the electrolyte solution, the solids formed when the electrolyte solution's valence is relatively low can be detrimental to that use. For example, in the context of an RFB, impurity solids on the negative side of the RFB's electrochemical cell can clog the negative electrode, causing the electrical performance of the RFB to degrade as the negative electrode becomes increasingly clogged by the solids over time.

Using a VRFB as an example, in order to manufacture electrolyte solutions for a VRFB cost effectively, an inexpensive source of vanadium oxides is required. Generally, low price vanadium oxides have high levels of impurities that end up in the electrolyte solutions and have a large negative impact on VRFB performance. As noted above, the most detrimental impurities are the ones that are aqueous in the as-received electrolyte solution, but will precipitate out as solids that clog the negative electrode after the system's initial charge. In other words, the most detrimental impurities are soluble/aqueous in an electrolyte solution of vanadium (III)/(IV) ions but are insoluble (i.e. form solid precipitates) in a solution of vanadium (II)/(III) ions. The purification process illustrated in FIG. 1 can readily be used to filter the precipitatable impurities out of the electrolyte solution prior to using the solution in a VRFB.

Referring particularly to FIG. 1, this figure illustrates purification and valence-adjustment performed in accordance with the present disclosure in the context of an example electrolyte solution in which the electrolyte has four possible oxidation states, here, +2, +3, +4, and +5. As seen in zone 100 of FIG. 1, the purification process involves first reducing the electrolyte solution to a valence that is lower than the valence at which the target impurity(ies) precipitate(s) out of the electrolyte solution. The starting valence in zone 100 can be anywhere from 3.5 to 5.0, depending on the vanadium oxide feedstock used; in FIG. 1 we assume $V_2O_5$ is the sole feedstock and the resulting starting valence is 5.0. In the example illustrated, the electrolyte solution is reduced approximately to its lowest oxidation state (here, an oxidation state of (II) (2.0)). For a vanadium-based electrolyte solution, for example, target impurities precipitate out of the solution at a valence at or below a valence of 3.0. Consequently, in some embodiments, the reduction need only take the valence of the electrolyte solution below about 3.0, such as 2.9 to 2.0. However, a lower valence can be desirable to accelerate the reduction process. The reduction can be performed using any suitable process, such as electrochemical reduction using an electrochemical cell. In one example, a hybrid electrochemical cell may be used, wherein one half-cell utilizes a VRB electrolyte, and the other half-cell uses a non-VRB reductant. In another example, the electrochemical cell may be configured to accept a VRB electrolyte on both halves of the cell.

Once the impurities precipitate out of the electrolyte solution, in zone 104 of FIG. 1 solid precipitates are removed from the solution. Precipitate removal can be performed using any suitable removal means, such as via one or more porous filters and/or one or more cyclones, among other things. Depending on the use of the electrolyte solution, only the precipitates of a certain size may need to be removed, such that the removal equipment can be designed accordingly. For example, in a VRFB that includes a negative electrode having a particular pore size, precipitates of a certain size smaller than this pore size may not need to be filtered, since they can flow through the negative electrode and not clog it.

At an optional step, illustrated in zone 108 of FIG. 1, the purified electrolyte solution, i.e., the solution having the desired amount of precipitate removed, may be oxidized to a desired valence. As an example and using a vanadium electrolyte, the purified electrolyte solution may be oxidized so that it has a mix of vanadium (III) and vanadium (IV) ions and a valence of about 3.5, which is the valence of conventional vanadium-based electrolyte solution typically provided for commissioning VRFBs. This mix is represented by line 112 in FIG. 1.

As another example using vanadium as the electrolyte, and as shown in FIG. 1, purified electrolyte solution may be oxidized to create two electrolyte solutions of differing valences, such as one electrolyte solution of valence at or below 3.0, such as a valence of 2.5, containing vanadium (II) and vanadium (III) ions and another electrolyte solution of valence at or above 4.0, such as a 4.5 valence, containing vanadium (IV) and vanadium (V) ions. These two electrolyte solutions are represented, respectively, in FIG. 1 by lines 116 and 120. In this example, these two electrolyte solutions can be used, respectively, as the negative and positive electrolyte solutions of a VRFB.

As mentioned above, when a VRFB is conventionally commissioned, an electrolyte solution of 3.5 valence is provided to both the negative and positive electrolyte tanks of the VRFB, and then the battery is charged so that the negative-side electrolyte solution settles at a valence of about 2.5 and the positive-side electrolyte solution settles at a valence of about 4.5. However, when the method of FIG. 1 is used to make the negative (such as a 2.5 valence) and positive (such as a 4.5 valence) electrolyte solutions and these electrolyte solutions are added to the VRFB, the commissioning charge step can be eliminated. It is noted that if the feedstock electrolyte solution is sufficiently pure, i.e., is sufficiently devoid of precipitatable impurities, then the impurity removal step can be eliminated in the process of making the negative and positive electrolyte solutions. This embodiment may be particularly useful when a high-oxidation-state material, such as $V_2O_5$ is used as sole vanadium feedstock for making the electrolyte.

In some embodiments, any of the methods represented by FIG. 1 may be performed at an electrolyte solution production facility such that the resulting electrolyte solution(s) is/are transported to the location of use, such as VRFB installation quite remote from the production facility. However, the cost of transporting electrolyte solutions can be quite high due to factors such as distance, corrosivity of the electrolyte solutions, and the fact that a large percentage of the weight of the solutions is due to the solvents (e.g., acid and water) in the solutions. Consequently, in other embodiments, any of the methods represented by FIG. 1 may be performed at or in close proximity to the location of use. For example, components, such as reduction equipment, precipitate removal equipment, and oxidation equipment, of a system can be containerized, palletized, or otherwise made readily transportable so that the method(s) can be performed locally.

In some embodiments, electrochemical cells are used for reduction and oxidation, and those cells need to be energized with electricity to drive the reactions. In such embodiments that are used proximate to the use locations of the fabricated electrolyte solutions and in which the solutions are used for batteries for renewable energy sources, such as wind turbines and solar farms, the electricity needed for the reduction and/or oxidation processes can be provided by the renewable energy sources.

Advantages of methods of the present disclosure over existing methods include:
- No prior method utilizes precipitation of impurities for removal. Precipitated impurities are removed mechanically, for example, via filtration and/or a hydrocyclone.
- No prior method utilizes both an electrochemical oxidation and reduction of the electrolyte for the formation and removal of key impurities.
- No prior method uses electrochemical cells for reduction and oxidation of the VRB electrolyte. An example of a cell for vanadium-based electrolyte reduction is a hydrogen/VRB cell, where $H_2$ gas is oxidized (consumed) at the cathode and VRB electrolyte is reduced at the anode. The oxidation cell is similar: $H_2$ is produced on the anode, and VRB electrolyte is oxidized on the cathode.
- No other method allows the production of both separate anolyte and catholyte solutions for a VRFB system using the same electrochemical system.

Figure 2:
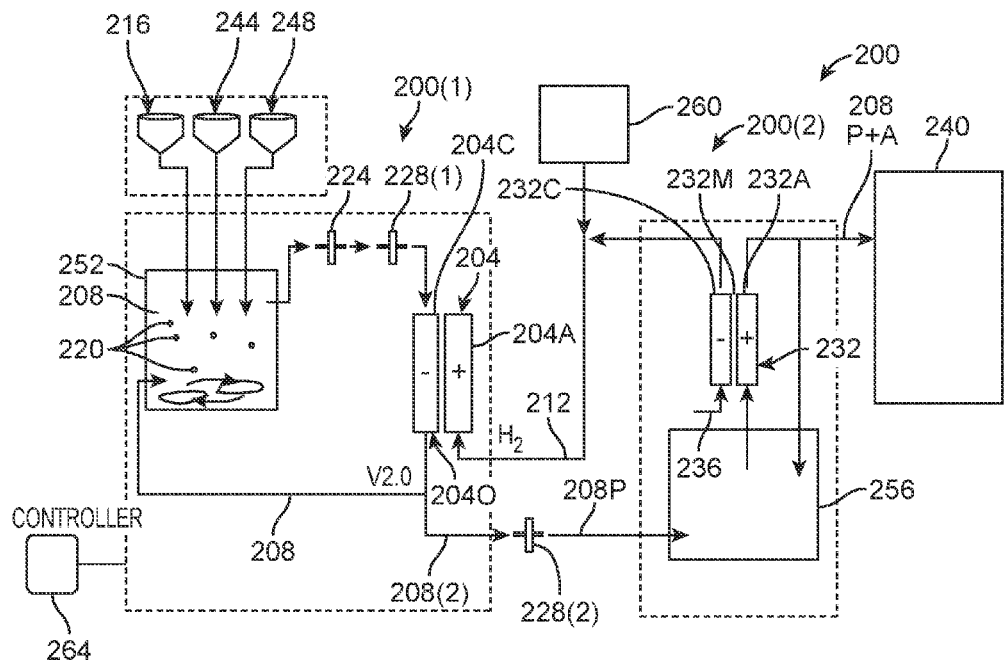
FIG. 2 is a schematic diagram of an example continuous electrolyte formation/purification and valence-adjustment process.

FIG. 2 illustrates an example purification process 200 that uses two electrochemical sub-processes, namely, a reduction/purification sub-process 200(1) for reducing and purifying the electrolyte solution and an oxidation sub-process 200(2) for adjusting the valence of the electrolyte solution to a desired valence. Process 200 of this example enables the use of vanadium oxides of a single oxidation state and of reduced purity. The formation and purification of the electrolyte solution in example process 200 is performed in a continuous manner, and the process is designed to operate at room temperature.

Example process 200 removes impurities that are the most detrimental to VRFB performance, namely, impurities that are aqueous in a mixed vanadium (III)/(IV) solution but that will form solid precipitates after charging to make vanadium (II)/(III) solution. As noted above, it is these precipitates that can clog the negative electrode. The purification performed by process 200 relies on the discovery that the most detrimental impurities will precipitate out in a vanadium (II)/(III) solution and that these impurities can be removed mechanically, such as by filtration and/or cycloning, among other things. In this example, other impurities, such as K, Na, and Al, are not removed in process 200, because they remain as aqueous ions in a vanadium (II)/(III) solution; however, the impact of these aqueous ions on battery performance is negligible.

Electrochemical reduction and subsequent oxidation of the vanadium-based electrolyte are critical to its formation and purification. In this example, the reduction and oxidation of the electrolyte solution are performed in two separate sub-processes, each using one or more of its own electrochemical cells. It is noted that for the sake of illustration, only a single electrochemical cell is shown for each of the two sub-processes 200(1) and 200(2), though each sub-process could use two or more electrochemical cells.

Reduction/purification sub-process 200(1), wherein electrochemical reduction of the vanadium electrolyte occurs, is performed by a "reduction cell" 204, such as a hybrid electrochemical cell. Electricity (not illustrated) is provided to operate reduction cell 204, and vanadium-based electrolyte solution 208 is reduced on the cathode 204C, and a reductant 212 is oxidized on the anode 204A. In the illustrated example, reductant 212 is $H_2$ gas, which provides for a relatively simple and inexpensive system. However, other reductants, such as water, formic acid, ethylene glycol, among others, could be used for reductant 212.

Figure 3A:
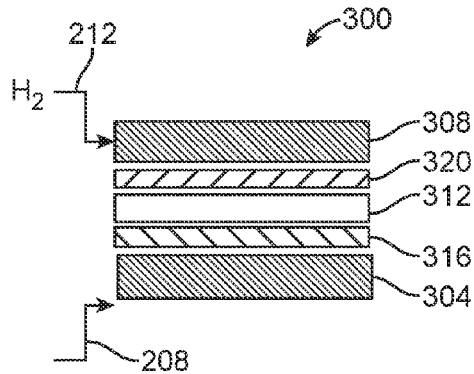
FIG. 3A is a diagram illustrating an example construction of the reduction cell of FIG. 2.
Figure 3B:
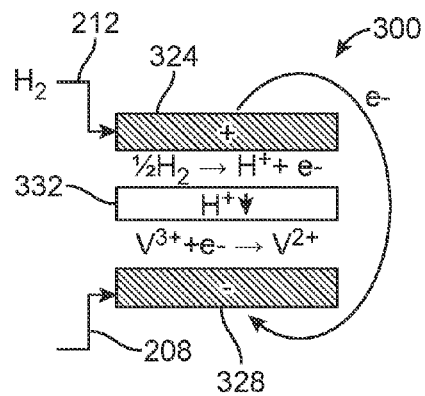
FIG. 3B is a diagram illustrating an example operation of the reduction cell having the construction of FIG. 3A, showing that a vanadium electrolyte is reduced and hydrogen gas is oxidized.

FIG. 3A illustrate an example construction of a reduction cell 300 that can be used for reduction cell 204 of FIG. 2. Referring to FIG. 3A, example reduction cell 300 includes an electrolyte flow field 304, a gas flow field 308 (here, for $H_2$ gas), a proton-exchange membrane 312, a carbon-paper electrode 316, and a gas diffusion layer 320 coated with an $H_2$ oxidation reaction catalyst (not shown). Electrolyte solution 208 (FIG. 2) is flowed into electrolyte flow field 304, while reductant 212, here, $H_2$ gas, is flowed into gas flow field 308. FIG. 3B illustrates the operation example reduction cell 300, with block 324 representing the anode side of the reduction cell receiving $H_2$ reductant 212, block 328 representing the cathode side of the reduction cell receiving electrolyte solution 208, and block 332 representing proton-exchange membrane 312 that allows hydrogen protons to pass from the cathode side to the anode side, with the flow of electrons following suit. FIG. 3B also illustrates the reduction of vanadium-based electrolyte solution 208 and the oxidation of $H_2$ reductant 212. Those skilled in the art will readily understand, the construction of reduction cell 300 illustrated in FIG. 3A is merely an example and that other constructions may be used as desired.

Referring again to FIG. 2, reduction/purification sub-process 200(1) performs two functions: 1) it creates vanadium (II) ions that aid in the chemical dissolution and reduction of an electrolyte 216, here $V_2O_5$ powder, and 2) it precipitates out the most deleterious impurities 220 and enables their removal via mechanical means (e.g., filtration and/or cycloning). In the example shown in FIG. 2, system 200 includes one or more suitable filters, here a coarse filter 224 and a pair of fine filters 228(1) and 228(2). The result is a purified electrolyte solution 208P that is purified to the extent that some or all of the precipitated impurities 220 have been removed, again, here, by filters 224, 228(1), and 228(2).

Reduction/purification process 200(1) may be controlled by an appropriate controller 264 that controls the process. Controller 264 may include any suitable hardware, such as a programmable logic controller, general purpose computer, application-specific integrated circuit, or any other hardware device(s) capable of executing a suitable control algorithm. Many types of hardware suitable for controller 264 are well known in the art. In one example, controller 264 is configured, via software or otherwise, to control the valence of the electrolyte solution flowing out of reduction cell 204, here electrolyte solution 208(2.0), by controlling the flow of impure electrolyte solution 208 from tank 252 into the reduction cell. In this example, inputs to the control algorithm include user settings, such as the electrical current within reduction cell 204, and a valence measurement of the electrolyte in tank 252 by a suitable valence sensor (not shown). For example, with a fixed cell current, controller 264 determines whether or not the measured valence is below a target value (e.g., the precipitation valence) and outputs one or more control signals that control one or more flow-control devices (not shown) that in turn control the flow of impure electrolyte solution 208 into reduction tank 252. Such flow-control devices may be, for example, one or more pumps, one or more valves, or one or more devices that changes the flow of impure feedstock into tank 252, or any combination of these, among others. In other embodiments, controller 264 can be configured to control both cell current and flow of impure electrolyte solution 208 so as to control the valence of the electrolyte solution within tank 252. Those skilled in the art will readily understand how to create a suitable algorithm for the control scheme selected for controller 264 based on this disclosure and for the type of hardware used.

Oxidation sub-process 200(2) in this example uses electrochemical oxidation to oxidize the purified electrolyte solution to bring it up to its desired valence state (such as near a 3.5 valence, near a 2.5 valence, and/or near a 4.5 valence, depending on the desired use). In this example, a hybrid electrochemical cell, referred to herein as an "oxidation cell" 232, is used to drive the oxidation in response to electricity (not illustrated) provided to the cell. Purified vanadium-based electrolyte solution 208P is oxidized on the anode 232A, and an oxidant 236 is reduced on the cathode 232C. In one example, protons are reduced to form $H_2$ gas on cathode 232C. This is particularly convenient when $H_2$ gas is used as reductant 212 in the reduction cell 204 as mentioned above. After oxidation, the valence-adjusted electrolyte solution(s) may be optionally transferred to a VRFB, as illustrated at box 240.

Figure 4A:
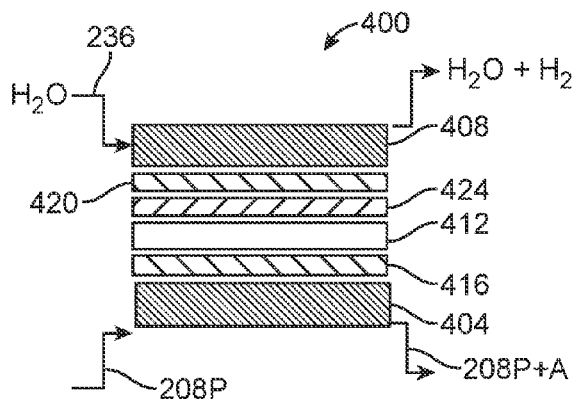
FIG. 4A is a diagram illustrating an example construction of the oxidation cell of FIG. 2.
Figure 4B:
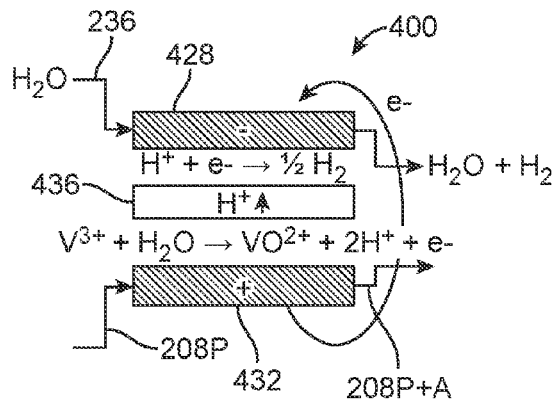
FIG. 4B is a diagram illustrating an example operation of an oxidation cell having the construction of FIG. 4A, showing that a vanadium electrolyte is oxidized while protons are reduced to hydrogen gas.

FIG. 4A illustrate an example construction of a reduction cell 400 that can be used for oxidation cell 232 of FIG. 2. Referring to FIG. 4A, example oxidation cell 400 includes an electrolyte flow field 404, an oxidant flow field 408 (here, for $H_2$ gas), a proton-exchange membrane 412, an oxidation-side carbon-paper electrode 416, a reduction-side carbon-paper electrode 420, and a gas diffusion layer 424 coated with an $H_2$ oxidation reaction catalyst (not shown). Electrolyte solution 208 (FIG. 2) is flowed into electrolyte flow field 404, while oxidant 236, here, protons, are formed in the oxidant flow field 408. FIG. 4B illustrates the operation of example oxidation cell 400, with block 428 representing the cathode side of the oxidation cell that receives $H_2O$ 236, block 432 representing the anode side of the oxidation cell that receives electrolyte solution 208P, and block 436 representing proton-exchange membrane 412 that allows hydrogen protons to pass from the cathode side to the anode side, with the flow of electrons following suit. FIG. 4B also illustrates the oxidation of vanadium-based electrolyte solution 208P and the reduction of the protons into $H_2$ gas, which is removed by $H_2O$ 236. Those skilled in the art will readily understand the construction of reduction cell 400 illustrated in FIG. 4A is merely an example and that other constructions may be used as desired.

Inputs for example process 200 of FIG. 2 are:

Materials:
  Generally, a solvent 244 for dissolving metal oxides 216, here $V_2O_5$ powder. For the vanadium compound of the illustrated example, this solvent is composed of one or more strong acids, such as sulfuric acid and/or hydrochloric acid. In other embodiments, other solvents, such as hydrobromic acid, and chloric acid, among others, can be used.
  If the forgoing solvent is not a polar solvent, a polar solvent 248. For the illustrated vanadium compound, water is used.
  An electrolyte, such as electrolyte 216. In the present example, the electrolyte is vanadium pentoxide ($V_2O_5$) powder. In other embodiments one or more vanadium oxides may be used, such as vanadium (III) oxide ($V_2O_3$) alone or in combination with vanadium (V) oxide ($V_2O_5$). In other embodiments, other electrolytes, such as iron-chrome flow battery, and all uranium flow battery, among others, can be used.
  A proton-donating reductant, such as reductant 212. In the present example, $H_2$ gas is used. In other embodiments, another reductant, such as hydrogen, water, formic acid, ethylene glycol, $H_2O_2$, among others, can be used.
  A proton-consuming oxidant, such as oxidant 232. In this example, protons were reduced to $H_2$ gas. An alternative could be to use oxygen or Air, where $O_2$ is reduced to $H_2O$.

Electricity:
  Electricity (not illustrated) provides the energy input into both the reduction cell and oxidation cell.

The final purified and adjusted electrolyte solution 208P+A in the present example (i.e., a vanadium-based electrolyte solution valence-adjusted to 3.5 valence) may contain:
  electrolyte with a supporting acid solution (generally sulfuric acid and/or hydrochloric acid);
  a balance of vanadium (III) and (IV) ions in solution in generally a 1:1 ratio; and
  additional additives for thermal stabilization.

In this example, reduction/purification sub-process 200(1) involves the electrochemical reduction of vanadium electrolyte solution 208. The chemical/electrochemical reactions for this exemplary reduction/purification sub-process 200(1) are shown below in Table I.

TABLE I

| | |
|---|---|
| Eqn. 1: $V_2O_{5(s)} + 2H^+ \rightarrow 2VO_2^+ + H_2O$ | $V_2O_5$ dissolution |
| Eqn. 2: $2VO_2^+ + 4V^{2+} + 8H^+ \rightarrow 6V^{3+} + 4H_2O$ | Chemical Reduction of V(V) reduction by V(II) |
| Eqn. 3: $6V^{3+} + 6e- \rightarrow 6V^{2+}$ | Electrochemical reduction of V(III) ion in reduction cell – cathode reaction |
| Eqn. 4: $3H_2 \rightarrow 6H^+ + 6e-$ | Electrochemical oxidation of reductant in reduction cell ($H_2$ as example reductant) – anode reaction |
| Eqn. 5: $V_2O_{5(s)} + 4H^+ + 3H_2 \rightarrow 2V^{2+} + 5H_2O$ | Net reaction for reduction/purification sub-process |

One of the main challenges of using $V_2O_5$ powder (electrolyte 216) is its limited solubility in strong acid solutions. Instead of making a vanadium (V) electrolyte solution, this exemplary process utilizes a reduced electrolyte solution of predominantly vanadium (II) ions to both dissolve and reduce the $V_2O_5$ powder. $V_2O_5$ powder, water, and acid are slowly added to a well-mixed tank (tank 252 in FIG. 2) containing electrolyte solution 208 of predominately vanadium (II) ions. The valence of predominantly vanadium (II) solution 208 in tank 252 is maintained via reduction cell 204. When the $V_2O_5$ powder (metal oxide 216) is dissolved (Table I, Eqn. 1) and reduced (Table I, Eqn. 2) in predominantly vanadium (II) solution 208, other vanadium ions are oxidized (Table I, Eqn. 2). This oxidation of vanadium ions is balanced using reduction cell 204, which continuously reduces electrolyte solution 208 to maintain a constant valence. Measurements from a set of sensors (not shown) that measure the vanadium (II) and (III) concentration and the total volume may be used to control the feed rates of $V_2O_5$ (metal oxide 216), acid (solvent 244), and water (polar solvent 248) into Tank 252, the electrical current into reduction cell 204, and the extraction rate of approximately 2.0 valence electrolyte 208(2.0) from the outlet 2040 of the reduction cell to a tank 256 of oxidation sub-process 200(2). Examples of sensors for measuring the vanadium (II) and (III) concentration include commercial off-the-shelf optical sensors and electrochemical cells having reference electrodes, among others.

The vanadium (II) ions in tank 252 serve two purposes. First, they aid in the rapid dissolution and reduction of $V_2O_5$ powder (metal oxide 216), as described previously. Second, the vanadium (II) ions provide a reducing atmosphere to reduce many of the most deleterious impurities (e.g., impurities 220) to their solid, neutral states. When in their solid states, the impurities are filtered out using mechanical means, again, here a series of course filter 224 and fine filter 228(1) placed upstream of reduction cell 204. In the example shown, coarse filter 224, for example, an activated carbon filter, filters relatively larger precipitated solids, and fine filters 228(1) and 228(2), for example, PTFE hydrophilic filters, filter relatively smaller precipitated particles. As noted above, in a VRFB context, the level of filtration can be dependent on the pore size of the negative electrode(s) used in the target VRFB.

In this example impurities 220 that precipitate out of reduced electrolyte solution 208 can include, but are not limited to, As and Ge metal precipitates. Filters 224, 228(1), and 228(2) before reduction cell 204 serve two functions: they 1) remove impurities 220 from electrolyte solution 208 and 2) protect the reduction cell from the precipitated impurities. The second function is successfully achieved if any of filters 224, 228(1), and 228(2) has a smaller effective pore size than the carbon-paper electrode of the reduction cell 204, such as carbon paper electrode 316 of FIG. 3A. The system of filters 224, 228(1), and 228(2) and reduction cell 204 shown in FIG. 2 allows for the continuous operation of the reduction cell. Methods that use electroplating/electrowinning would require frequent chemical cleaning of the cell or electrode replacement, temporarily shutting down operation.

Reduction cell 204 operates by reducing vanadium (III) ions at cathode 204(C) (Table I, Eqn. 3) and oxidizing reductant 212 at anode 204(A). As noted above, in this example $H_2$ gas is used as reductant 212 (Table I, Eqn. 4), but as also noted above, other chemical reductants could be used, such as water, formic acid, or ethylene glycol, among others. In this example, reductant 212, here $H_2$ gas, is provided both from an $H_2$ source 260 and an oxidation cell 232 of oxidation sub-process 200(2), which produces $H_2$ gas. An example of construction of reduction cell 204 and the appropriate half-cell reactions are shown in FIGS. 3A and 3B, respectively. Downstream of outlet 2040 (FIG. 2) of reduction cell 204, a portion of purified electrolyte solution 208P is returned to tank 252 to aid in the dissolution and reduction of $V_2O_5$ powder (metal oxide 216), and a portion is moved to oxidation sub-process 200(2).

Oxidation sub-process 200(2) involves oxidizing purified electrolyte solution 208P. The chemical/electrochemical reactions for this exemplary process are shown below in Table II.

TABLE II

| | |
|---|---|
| Eqn. 6: $H^+ + e^- \rightarrow \tfrac{1}{2} H_2$ | Hydrogen gas generation (cathode reaction) |
| Eqn. 7: $V^{3+} + H_2O \rightarrow VO^{2+} + 2H^+ + e^-$ | Vanadium electrolyte oxidation (anode reaction) |
| Eqn. 8: $V^{3+} + H_2O \rightarrow \tfrac{1}{2}H_2 + VO^{2+} + H^+$ | Net reaction for oxidation cell process |

Purified electrolyte solution 208P of average valence that is below the critical precipitation valence (i.e. below 2.9) transferred from sub-process 200(1) into tank 256. Purified electrolyte solution 208P in tank 256 is kept just below the final desired valence (generally 3.5 in this example). Purified electrolyte solution 208P from tank 252 is pumped into oxidation cell 232, which oxidizes the purified electrolyte solution to the desired final valence to make valence-adjusted electrolyte solution 208P+A. A portion of the output of oxidation cell 232 is returned to tank 256 to maintain a constant valence, and, in the present example, the remainder is transferred into a VRFB, as indicated by box 240.

In this example, electrochemical oxidation cell 232 oxidizes purified electrolyte solution 208P and reduces protons (i.e., produces $H_2$ gas). Specifically, oxidation cell 232 oxidizes vanadium (III) ions at the anode 232A via the half-reaction shown in Table II, Equation 7, and reduces protons to form $H_2$ gas at the cathode 232C, as described by the half-reaction shown in Table II, Equation 6. The net reaction for example oxidation cell 232 is given in Table II, Equation 8. In oxidation cell 232, water is circulated on the $H_2$-producing side (i.e., cathode 232C), as it helps wash away any vanadium ions that migrate over the membrane 232M to the cathode.

As described above, an alternative process could produce purified valence-adjusted electrolyte solution 208P+A at any desired valence. For example, oxidation cell 232 could oxidize a first batch of purified valence-adjusted electrolyte solution 208P+A to 2.5 valence for the negative electrolyte solution of a VRFB and a second batch of the purified valence-adjusted electrolyte solution to 4.5 valence for the positive electrolyte solution of the VRFB. Transferring these two separate solutions into, respectively, the catholyte tank and the anolyte tank of a VRFB would eliminate the need for the formation charging process required in commissioning a new battery system.

Figure 12A:
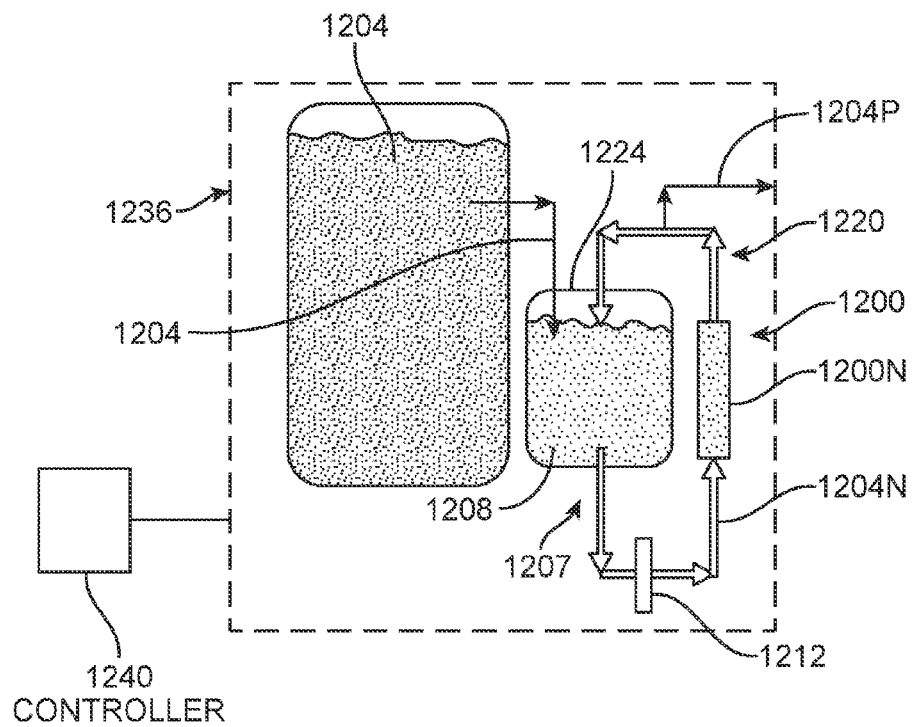
FIG. 12A is a diagram illustrating the reduction sub-process for a purification system that uses an electrochemical cell that accepts VRB electrolyte on both positive and negative electrodes.
Figure 12B:
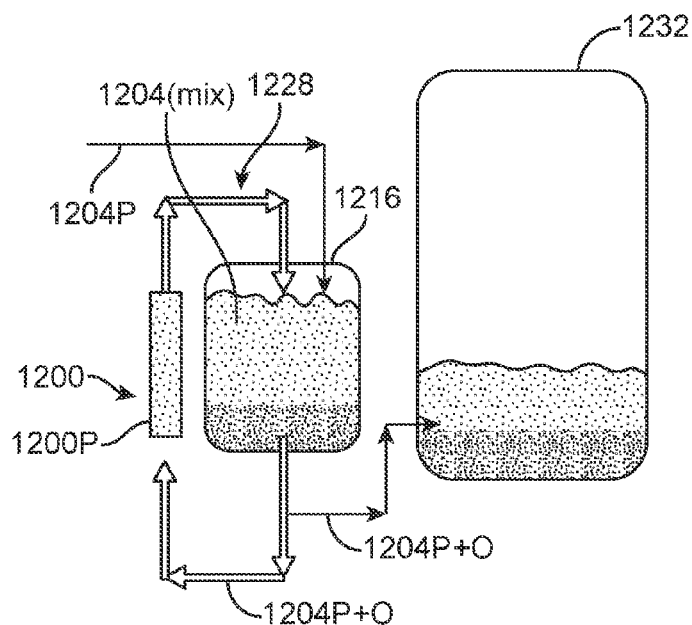
FIG. 12B is a diagram illustrating the oxidation sub-process for a purification system that uses an electrochemical cell that accepts VRB electrolyte on both positive and negative electrodes.
Figure 13:
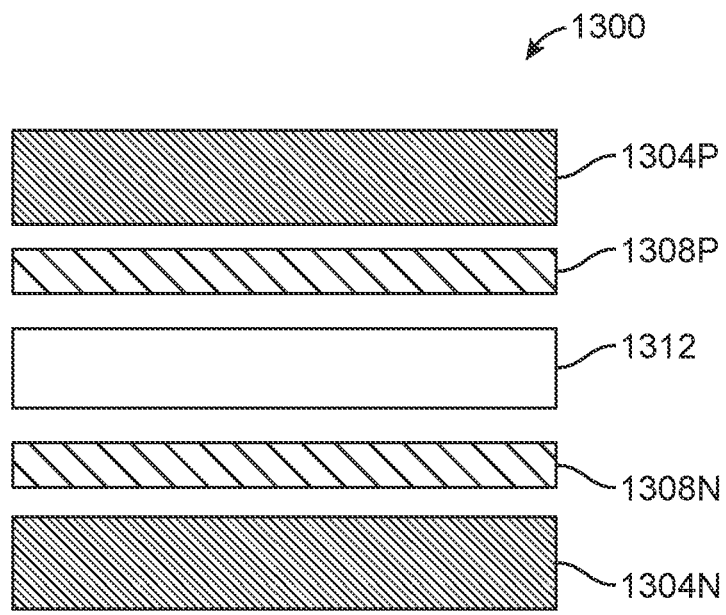
FIG. 13 is a diagram illustrating an electrochemical cell that can be used in each of the reduction and oxidation sub-processes illustrated, respectively, in FIGS. 12A and 12B.

In another embodiment, shown in FIGS. 12A and 12B, each of one or more electrochemical cells, here electrochemical cell 1200 having a negative side 1200N (FIG. 12A) and a positive side 1200P (FIG. 12B), accepts an electrolyte solution, such as a vanadium-based electrolyte solution, on both the positive and negative sides of the cell. This eliminates the need for a separate reductant for the reduction/purification sub-process and a separate oxidant for the oxidation sub-process. FIG. 13 illustrates and example electrochemical cell 1300 that can be used as electrochemical cell 1200 of FIGS. 12A and 12B. Referring to FIG. 13, electrochemical cell 1300 may have a symmetric design comprised of negative and positive flow fields 1304N, and 1304P, respectively, negative and positive carbon paper electrodes 1308N and 1308P, respectively, and a proton-exchange membrane 1312 between the negative and positive sides of the cell.

In one example for purifying a vanadium-based electrolyte solution, the starting impure electrolyte solution 1204 (FIG. 12A) may be made of roughly equal amounts vanadium (III) and vanadium (IV) and contains at least one impurity to be removed by the process. Impure electrolyte solution 1204 could be made, for example, using either of the methods described in the Background section above (i.e., either Method 1 or Method 2). In the process illustrated in FIGS. 12A and 12B, the negative electrode 1200N of each electrochemical cell 1200 reduces electrolyte solution 1204 to below a critical impurity precipitation valence (see, e.g., zone 104 of FIG. 1), while the positive electrode 1200P of each electrochemical cell oxidizes vanadium (III) to vanadium (IV). Upstream of the negative electrode(s) 1200N (FIG. 12A), one or more filters, represented schematically at 1212 of FIG. 12A and which can be the same as or similar to filters 224, 228(1), and 228(2) of FIG. 2, capture precipitated impurities in the negative-side electrolyte solution 1204N prior to them entering negative electrode 1200N.

After passing through filter(s) 1212, a portion of this now-purified electrolyte 1204P solution can, for example, be transferred to a positive electrolyte tank 1216 (FIG. 12B). This transfer process counteracts the electrochemical oxidation of the fluid in the positive-side electrolyte loop 1220 (FIG. 12B) and maintains an approximately 3.5 valence. Similarly, starting electrolyte solution 1200 (FIG. 12A) of lower-purity is slowly transferred to a negative-side electrolyte tank 1224. This transfer chemically counteracts the electrochemical reduction and maintains a valence at or below the critical precipitation valence. The solution in positive-side electrolyte loop 1228 (FIG. 12B) (stored in positive-side tank 1216) is free of the key contaminants that would precipitate in a VRFB system. The positive-side purified and oxidized electrolyte solution 1204P+0 is free deleterious impurities and is transferred to a holding tank 1232, where it may be stored prior to use, for example, in a VRFB system. While this embodiment adds additional material costs for the electrolyte due to the chemical reducing agent or the reduced vanadium oxide, its primary function is to remove key impurities from the electrolyte. When individual electrochemical cells use the same basic electrolyte solution on both their positive and negative sides, these cells may be conveniently called "electrolyte-only electrochemical cells."

It is noted that on the reduction/purification side (FIG. 12A), the reduction/purification process 1236 may be controlled by an appropriate controller 1240 that controls the reduction/purification sub-process. Like controller 264 of FIG. 2, controller 1240 of FIG. 12A may include any suitable hardware, such as programmable logic controller, general purpose computer, application-specific integrated circuit, or any other hardware device(s) capable of executing a suitable control algorithm. Many types of hardware suitable for controller 1240 are well known in the art. In one example, controller 1240 is configured, via software or otherwise, to control the valence of the electrolyte solution flowing out of negative side 1200N of reduction cell 1200, here electrolyte solution 1204P by controlling the flow of impure electrolyte solution 1204 from negative-side electrolyte tank 1224 into the reduction cell. In this example, inputs to the control algorithm include user settings, such as the electrical current within reduction cell 1200, and a valence measurement taken of the electrolyte 1208 in the tank 1224 by a suitable valence sensor. For example, with a fixed cell current, controller 1240 determines whether or not the measured valence is below a target value (e.g., the precipitation valence) and outputs one or more control signals that control one or more flow-control devices (not shown) that control the flow of impure electrolyte solution 1204 into reduction cell 1200. Such flow-control devices may be, for example, one or more pumps, one or more valves, or one or more devices that changes the flow impure feedstock into the negative-side electrolyte tank 1224, or any combination of these, among others. In other embodiments, controller 1240 can be configured to control both cell current and impure electrolyte solution flow so as to control the valence of the electrolyte solution (here, solution 1208). Those skilled in the art will readily understand how to create a suitable algorithm for the control scheme selected for controller 1240 based on this disclosure and considering the type of hardware used.

Figure 14:
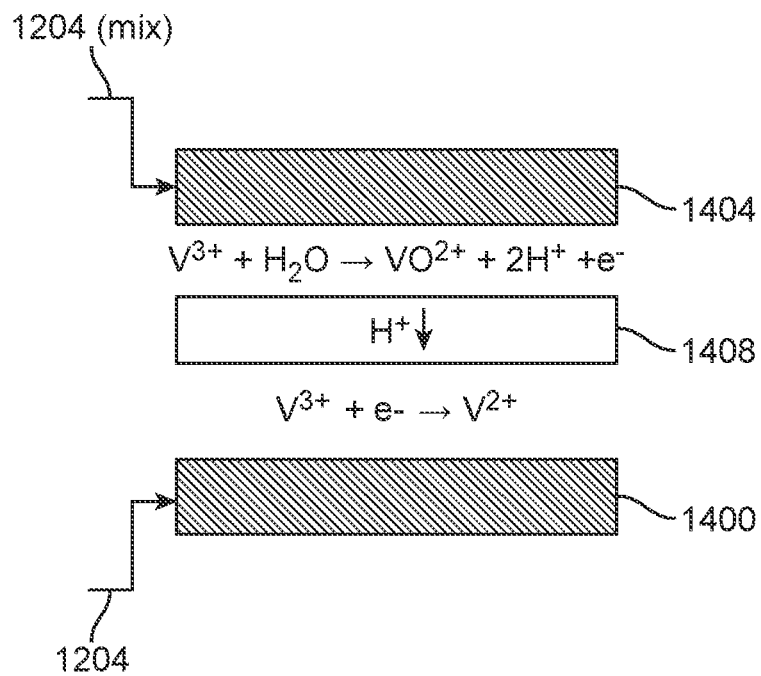
FIG. 14 is a diagram illustrating the reactions present in the electrochemical cell of FIG. 13.

FIG. 14 illustrates the operation of example electrochemical cell 1200 (FIGS. 12A and 12B), with block 1400 representing the cathode side of the electrochemical cell that receives electrolyte solution 1204 from negative side electrolyte tank 1224 (FIG. 12A), block 1404 representing the anode side of the electrochemical cell that receives electrolyte solution 1204 (mix) from positive-side tank 1216 (FIG. 12B), and block 1408 representing proton-exchange membrane 1312 (FIG. 13) that allows hydrogen protons to pass from the cathode side to the anode side. Those skilled in the art will readily understand the construction of electrochemical cell 1200 illustrated in FIGS. 12A and 12B is merely an example and that other constructions may be used as desired.

Lab-Scale Experimental Results

Overview and Summary of Lab Scale Results

A purification process in accordance with aspects of the present disclosure was demonstrated on the lab scale. Following is an overview of that process.

A desirable industrial-scale system is a system that performs continuous electrolyte formation/purification. However, for proof of concept at the lab scale, a batch process was used.

Reduction of the 3.5 valence initial electrolyte solution was done using a $H_2$/VRB hybrid electrochemical cell 500 (FIG. 5) identical to the cell illustrated in FIG. 3A.

Oxidation of the purified electrolyte solution was performed in a hybrid electrochemical cell 800 (FIG. 8) identical to the cell illustrated in FIG. 4A.

Reduction/Purification Sub-Process Demonstration at Lab-Scale

Two samples of an initial electrolyte solution having a starting valence of 3.5, i.e., Batch 1 and Batch 2, were subjected to a version of the reduction/purification process described above. Each sample was 3 liters in volume and was reduced to a solution of 2.0 valence. The vanadium content of each sample was between 1.4 mol/liter and 1.65 mol/liter. The same reduction cell 500 (FIG. 5) (no electrode replacement or membrane replacement) was used for both samples. The construction of reduction cell 500 is identical in construction and operation to reduction cell 300 as illustrated in FIGS. 3A and 3B, respectively. The active area of reduction cell 500 (FIG. 5) was 23 $cm^2$.

Figure 5:
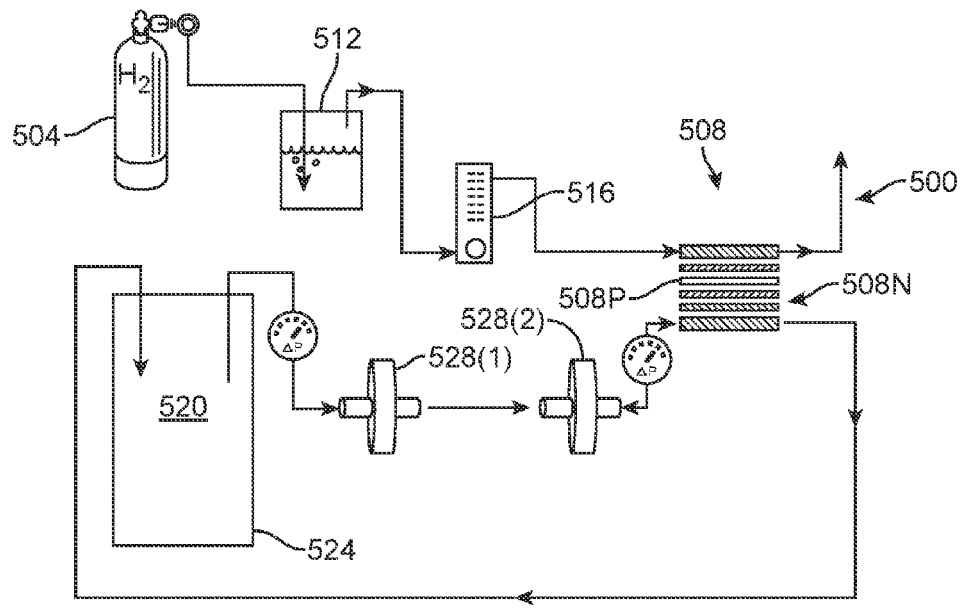
FIG. 5 is a schematic diagram of the reduction/purification sub-process used in experimental lab-scale testing.
Figure 6A:
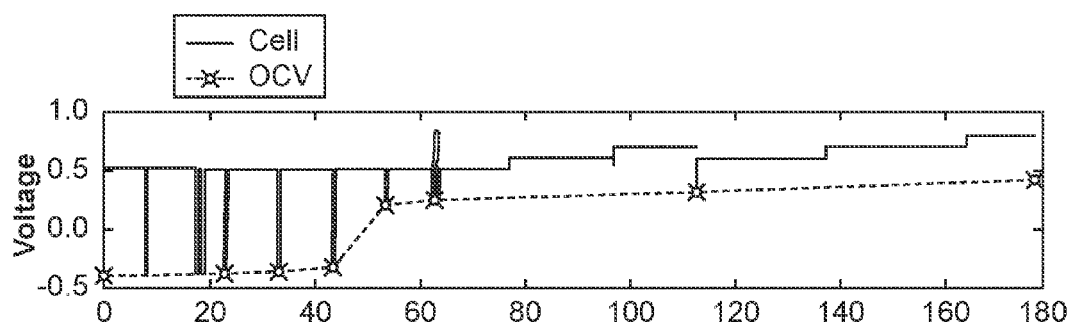
FIG. 6A is a graph of cell operating and open-circuit voltages versus time (hours) in the reduction cell of FIG. 5 for Batch 1 containing 3 liters of impure electrolyte containing high levels of As (5 ppm) and Ge (0.2 ppm) and having a starting valence of 3.5.
Figure 6B:
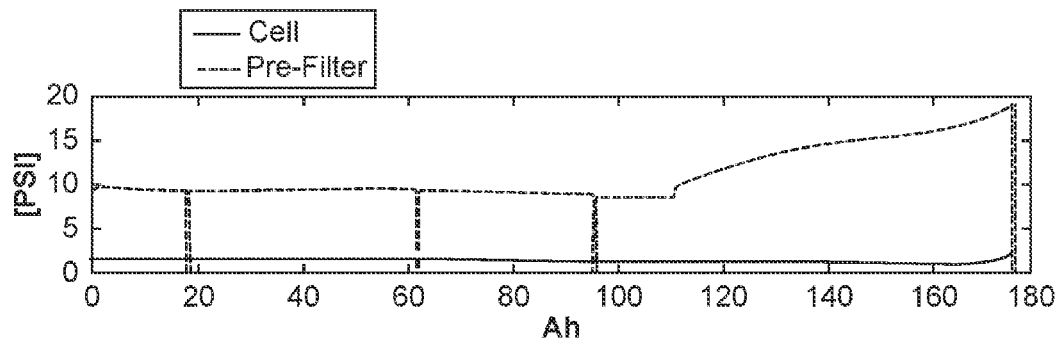
FIG. 6B is a graph of pressure versus time (hours) for Batch 1 for pressure just upstream of the filter prior to the reduction cell of FIG. 5 and the pressure at the inlet to the reduction cell.
Figure 7A:
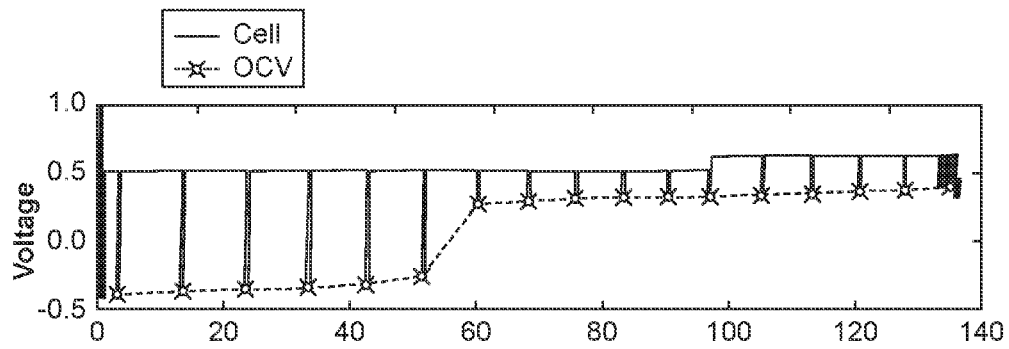
FIG. 7A is a graph of cell operating and open-circuit voltages versus time (hours) of the reduction cell of FIG. 5 for Batch 2 containing 3 liters of impure electrolyte containing high levels of As (5 ppm) and Ge (0.2 ppm) and having a starting valence of 3.5.
Figure 7B:
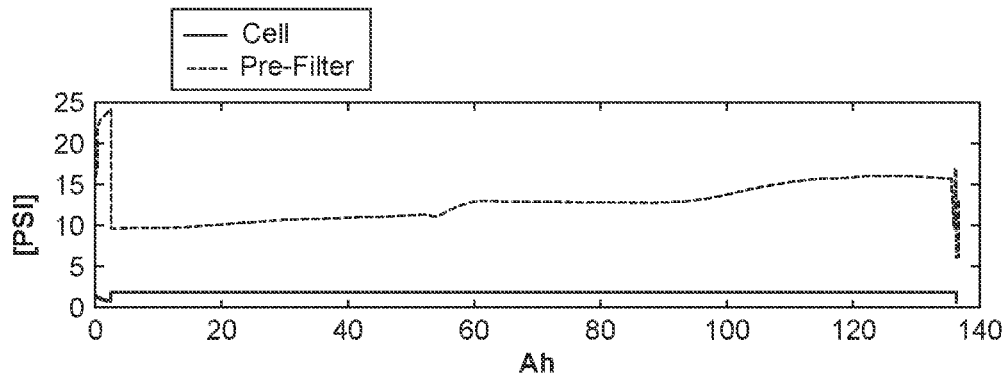
FIG. 7B is a graph of pressure versus time (hours) for Batch 2 for pressure just upstream of the filter prior to the reduction cell of FIG. 5 and the pressure at the inlet to the reduction cell.

FIG. 5 illustrates the lab-scale reduction/purification sub-process used in the testing of Batches 1 and 2. A hydrogen cylinder 504 provided hydrogen to an $H_2$/VRB cell 508 on the positive electrode 508P. The dry hydrogen was humidified by passing it through deionized water (DI) in a bubbler 512. A flow regulator 516 controlled the flow of hydrogen into $H_2$/VRB cell 500. A VRB electrolyte 520 was stored in a plastic tank 524. VRB electrolyte 520 in tank 524 was recirculated through H$_2$/VRB cell 508 on the negative electrode 508N and passed through two filters 528(1) and 528(2) prior to entering the cell. Recirculation was performed by a peristaltic pump (not shown). A DC current (not illustrated) was applied to H$_2$/VRB cell 508, which oxidized the hydrogen and reduced the vanadium in VRB electrolyte 520. Filters 528(1) and 528(2) upstream of H$_2$/VRB cell 508 consisted, respectively, of a coarse filter (activated carbon) and a fine filter (hydrophilic PTFE filter with 0.5-micron pore size). Cell voltages in H$_2$/VRB cell 500 are shown in FIG. 6A for Batch 1 and in FIG. 7A for Batch 2, and cell pressures are shown in FIG. 6B for Batch 1 and in FIG. 7B for Batch 2. Open-circuit voltages reported in FIGS. 6A and 7A were measured by periodically removing DC current from the cell. The reduction/purification sub-process appears to have been successful in both instances, demonstrating two key concepts, namely:

The pressure (FIGS. 6B and 7B) measured upstream of filters 528(1) and 528(2) (FIG. 5) increased as the process continued. This pressure rise indicates that filters 528(1) and 528(2) are successfully capturing impurities that are precipitating.

The pressure (FIGS. 6B and 7B) just upstream of reduction cell 508 (FIG. 5) does not increase during the sub-process, indicating that filters 528(1) and 528(2) protect the reduction cell from clogging because of precipitated impurities.

Oxidation Sub-Process Demonstration at Lab-Scale

Figure 8:
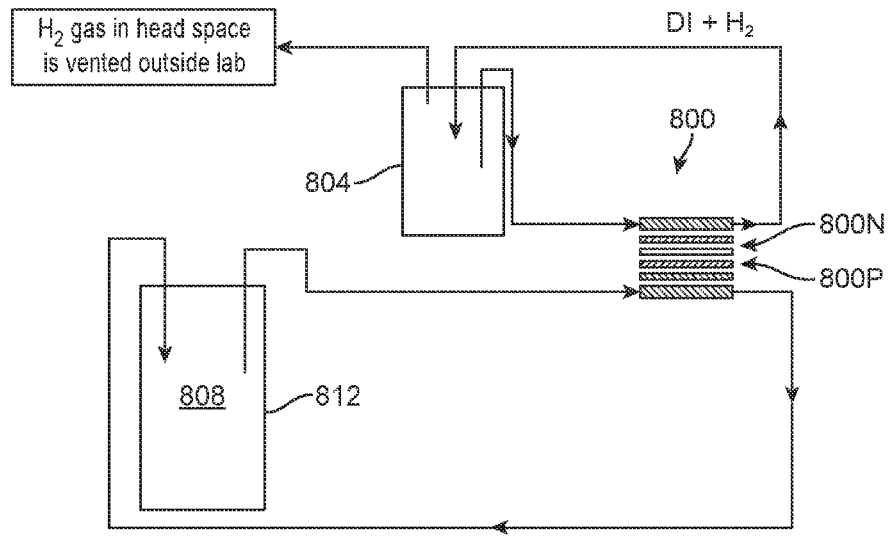
FIG. 8 is a schematic diagram of the oxidation sub-process used in the experimental lab-scale testing.
Figure 9A:
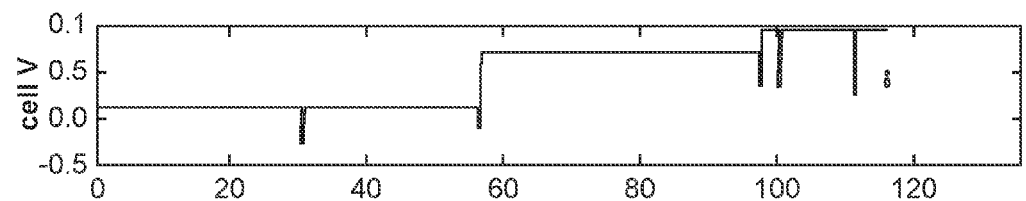
FIG. 9A is a graph of voltage versus time (hours) for the oxidation of the Batch 1 electrolyte in the oxidation sub-process of FIG. 8.
Figure 9B:
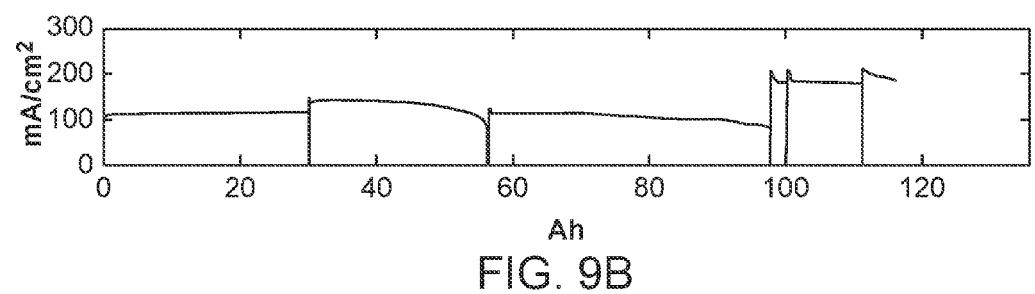
FIG. 9B is a graph of current density versus time (hours) in the oxidation cell of FIG. 8.

Batch 1 of the purified electrolyte solution from the reduction/purification sub-process was oxidized to a 3.5 valence using an H$_2$/VRB cell 800 (FIG. 8), which was identical in construction and operation to the construction and operation of oxidation cell 400 shown in FIGS. 4A and 4B, respectively. The batch-type oxidation sub-process performed at the lab scale is illustrated in FIG. 8. DI water was stored in a plastic tank 804, where it is recirculated through H$_2$/VRB cell 800 on the negative electrode. The flow of DI water helped remove any vanadium that migrated over to the negative electrode 800N. VRB electrolyte 808 was stored in plastic tank 812 and was recirculated through H$_2$/VRB cell 800 on the positive electrode 800P of the cell. A DC current (not illustrated) was applied to H$_2$/VRB cell 800, which reduced protons to hydrogen gas and oxidized the vanadium in VRB electrolyte 808. The voltage and current densities within H$_2$/VRB cell 800 are shown, respectively, in FIGS. 9A and 9B. The active area of H$_2$/VRB cell 800 (FIG. 8) was 23 cm$^2$.

Verification of Electrolyte Purification at Lab-Scale

Figure 10:
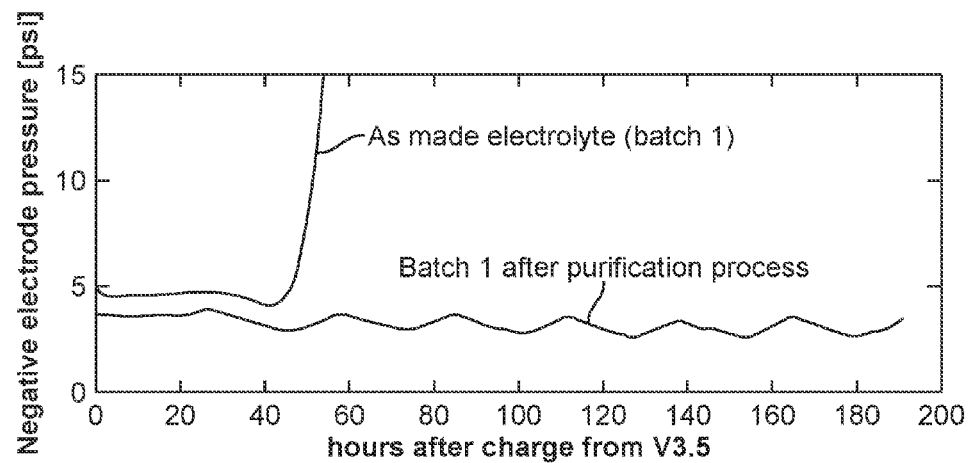
FIG. 10 is a graph of negative electrode pressure versus time (hours) for both of the as-made electrolyte of Batch 1 and the electrolyte of Batch 1 after reduction/purification using the experimental process.
Figure 11A:
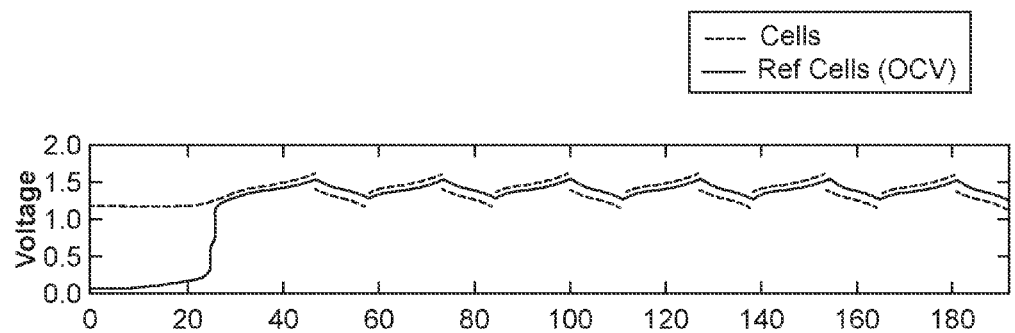
FIG. 11A is a graph of cell and reference cell voltages versus time (hours) for Batch 1 after reduction/purification using the experimental process.
Figure 11B:
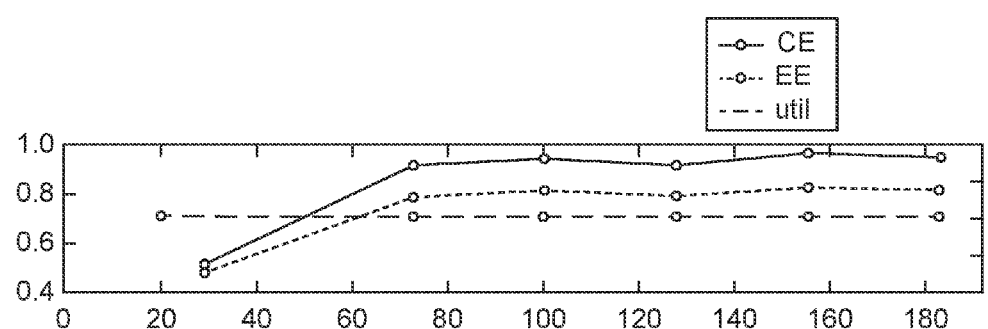
FIG. 11B is a graph illustrating the Coulombic efficiency, energy efficiency, and vanadium utilization over time (hours) for the purified Batch 1.
Figure 11C:
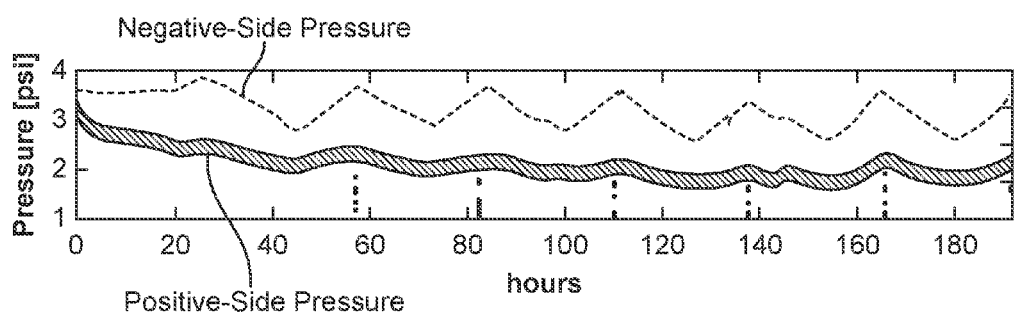
FIG. 11C is a graph of pressure versus time (hours) showing negative-side and positive-side electrolyte pressures.

Batch 1 was tested in a sub-scale VRB system to verify that the key impurities had been removed to an acceptable level in the electrolyte. The performance of the electrolyte before and after the purification process is shown in FIG. 10, which compares the negative electrode pressures during operation before and after the lab-scale purification process. Full cell operation metrics for the purified Batch 1 electrolyte (voltages, cell resistances, cycle performance, and pressures) are shown in FIGS. 11A to 11C. In FIG. 11B, "CE" stands for Coulombic efficiency, "EE" stands for energy efficiency, and "Util" stands for utilization of vanadium. Data represented in FIG. 11C are for negative-side pressure and positive-side pressure with a lab-scale full VRB cell with respective vanadium-based electrolyte solutions flowing on corresponding respective sides of the cell.

An overview of the system parameters and specifications is given below and illustrated in FIGS. 11A to 11C:

Cycling parameters:
Open-circuit voltage at end of discharge=1.28 V
Open-circuit voltage at end of charge=1.52 V
Max charge cell voltage=1.6 V System Specifications:
1.46 mol/liter V
3.50 valence
2.8 liter total system volume (positive and negative electrolytes)
2× Carbon paper electrodes
Proton exchange membrane
11 cm$^2$ active area The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of making a purified electrolyte solution for use in a vanadium redox flow battery, the method comprising:

providing a vanadium-based electrolyte solution having an initial average valence and containing at least one non-vanadium-containing impurity having a precipitation valence below 3.0 and that precipitates out of the vanadium-based electrolyte solution when the valence of the electrolyte solution is at or below the precipitation valence;

reducing the electrolyte solution from the initial average valence to a valence below 3.0 so as to cause the at least one non-vanadium-containing impurity to precipitate out of the electrolyte solution as a solid precipitate; and while the valance of the electrolyte solution is below 3.0, mechanically separating the solid precipitate out of the electrolyte solution using at least one of 1) a flow-through porous filter and 2) a hydrocyclone so as to make the purified electrolyte solution.

2. The method according to claim 1, wherein the reducing of the vanadium-based electrolyte solution to an average valence of below 3.0 includes reducing the vanadium-based electrolyte solution to an average valence of less than 2.5.

3. The method according to claim 1, wherein the reducing of the vanadium-based electrolyte solution to an average valence of below 3.0 includes reducing the vanadium-based electrolyte solution to a valence of substantially 2.0.

4. The method according to claim 1, wherein the reducing of the vanadium-based electrolyte solution is performed using a hybrid electrochemical cell.

5. The method according to claim 4, wherein the reducing of the vanadium-based electrolyte solution utilizes hydrogen gas as a reductant.

6. The method according to claim 1, further comprising oxidizing the purified electrolyte solution to the desired valence prior to installing the purified electrolyte solution into the vanadium redox flow battery.

7. The method according to claim 6, wherein the desired valence is substantially 3.5.

8. The method according to claim 6, wherein the desired valence is substantially 4.5.

9. The method according to claim 6, wherein the desired valence is substantially 2.5.

10. The method according to claim 1, further comprising, prior to installing the purified electrolyte solution into the vanadium redox flow battery, oxidizing at least a portion of the purified electrolyte solution to each of two valences so as to create a plurality of purified valence-adjusted electrolyte solutions of differing valence.

11. The method according to claim 10, wherein oxidizing at least a portion of the purified electrolyte solution includes oxidizing a first portion of the purified electrolyte solution to an average valence of greater than 3.5 and oxidizing a second portion of the electrolyte solution to an average valence of less than 3.5.

12. The method according to claim 11, wherein the oxidizing of a first portion of the purified electrolyte solution to an average valence of greater than 3.5 includes oxidizing the first portion to an average valence of about 4.5 and oxidizing a second portion of the purified electrolyte solution to an average valence of less than 3.5 includes oxidizing the second portion to an average valence of about 2.5.

13. The method according to claim 10, wherein the oxidizing of at least a portion of the purified electrolyte solution is performed using a hybrid electrochemical reduction cell.

14. The method according to claim 13, wherein the oxidizing of at least a portion of the purified electrolyte solution utilizes the formation of hydrogen gas from protons.

15. The method according to claim 14, wherein the reducing of the purified electrolyte solution is performed using a hybrid electrochemical reduction cell.

16. The method according to claim 15, wherein the reducing of the purified electrolyte solution utilizes hydrogen gas output from the hybrid electrochemical oxidation cell.

17. The method according to claim 10, wherein the reducing of the vanadium-based electrolyte solution and the oxidizing of at least a portion of the purified electrolyte solution are performed using an electrolyte-only electrochemical cell having a reduction side and an oxidation side with the vanadium-based electrolyte solution on the reduction side and the purified electrolyte solution on the oxidation side.

18. The method according to claim 1, wherein all vanadium in the vanadium-based electrolyte solution comes substantially only from mixing $V_2O_5$ with at least one strong acid.

19. The method according to claim 18, wherein all the vanadium in the vanadium based electrolyte solution comes substantially from $V_2O_5$ and $V_2O_3$, each mixed with at least one strong acid.

20. The method according to claim 1, wherein the vanadium-based electrolyte solution has a lowest possible valence and the reducing of the vanadium-based electrolyte solution includes reducing the vanadium-based electrolyte solution to about the lowest valence.

* * * * *